Nov. 1, 1949  R. F. WILD  2,487,010
ELECTRIC MOTOR CONTROL APPARATUS
Filed Jan. 17, 1947  2 Sheets-Sheet 1

INVENTOR.
RUDOLF F. WILD
BY Arthur H. Swanson
ATTORNEY

Nov. 1, 1949  R. F. WILD  2,487,010
ELECTRIC MOTOR CONTROL APPARATUS
Filed Jan. 17, 1947  2 Sheets-Sheet 2

*INVENTOR.*
RUDOLF F. WILD
BY Arthur H. Swanson
ATTORNEY

Patented Nov. 1, 1949

2,487,010

UNITED STATES PATENT OFFICE 2,487,010

ELECTRIC MOTOR CONTROL APPARATUS

Rudolf F. Wild, Philadelphia, Pa., assignor, by mesne assignments, to Minneapolis-Honeywell Regulator Company, Minneapolis, Minn., a corporation of Delaware Application January 17, 1947, Serial No. 722,599

18 Claims. (Cl. 318—28)

The general object of the present invention is to provide improved means for amplifying small unidirectional voltages such as the unbalance voltage produced in a self-balancing potentiometric measuring system by a change in thermocouple voltage or other voltage being measured. More specifically, the general object of the present invention is to provide improved means for converting a small unidirectional voltage into an alternating current which may be amplified by any usual or suitable apparatus for amplifying small alternating currents of relatively low frequency.

A more specific object of the invention is to provide a novel converter of the modulator type including an electronic control valve having a control grid on which the unidirectional voltage to be amplified is impressed and an electronic reference valve having a control grid on which a constant unidirectional reference voltage is impressed, combined with means for making the valves alternately conductive and non-conductive, with the same frequency, and for combining and amplifying the pulsating output voltages of the two valves.

A further and more specific object of the invention is to provide novel and effective means for making the control and reference valves conductive alternately, comprising two exciter electronic valves with their cathodes directly connected one to the cathode of the control valve, and the other to the cathode of the reference valve, and comprising means for supplying unidirectional plate current to each of the four valves and alternating current means connected to the control grids of the two exciter valves to make those valves alternately conductive.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Figures 1, 2:
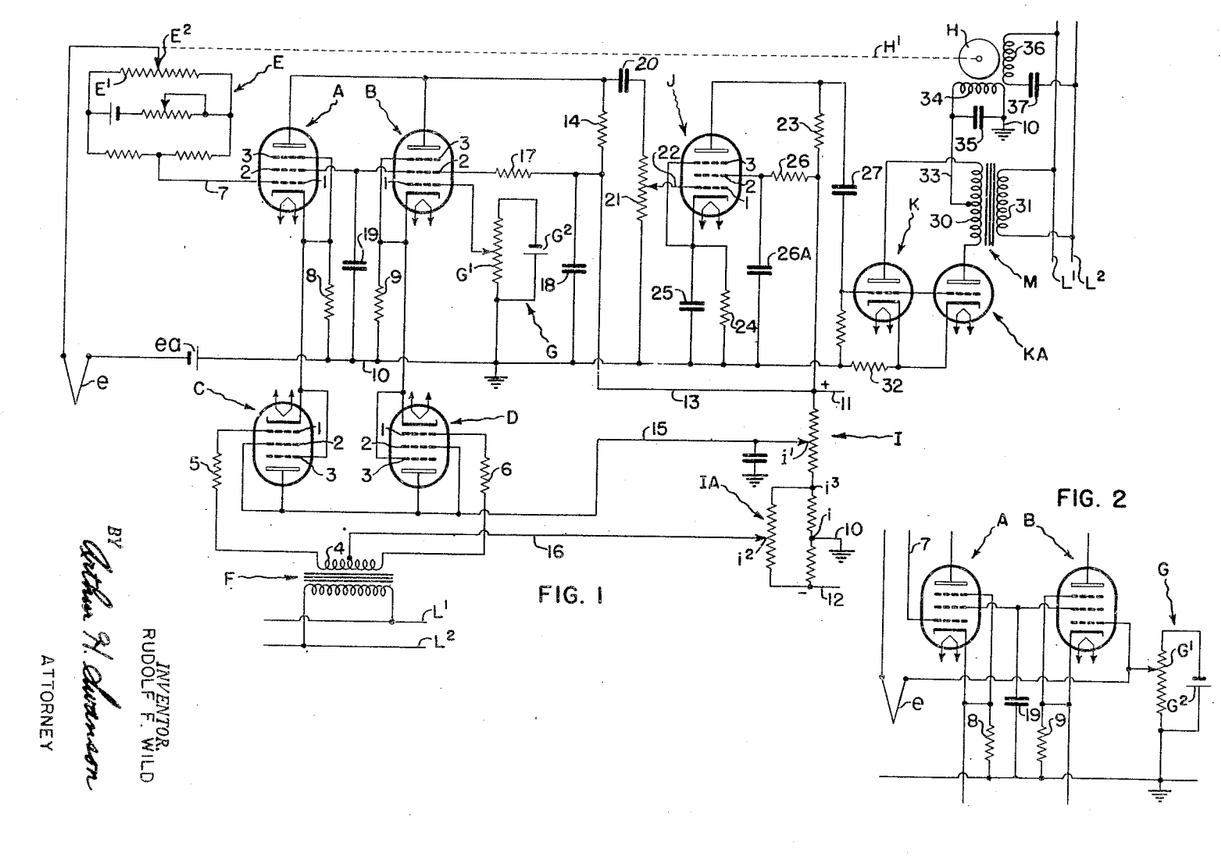
Fig. 1 is a diagram illustrating a preferred embodiment of the invention.
Fig. 2 illustrates a modified form of a portion of the apparatus shown in Fig. 1.

In Fig. 1 I have diagrammatically illustrated a desirable embodiment of the present invention including a modulator unit comprising four similar electronic valves A, B, C and D. Each of said valves is shown as a pentode, which may be of the commercially available 6AC7 type, and includes a control grid 1, a screen grid 2 and a suppressor grid 3, the latter being connected to the cathode of the tube. In the modulator unit shown in Fig. 1, the tube A is a control valve, the tube B is a reference valve and the valves C and D are clipping tubes. The tubes C and D are included in an exciter unit operating to alternately drive the control valve A and the reference valve B beyond their current cut-off points during respective half cycles of a relatively low frequency alternating current voltage employed to impress A. C. signals of opposite phases on the control grids of the clipping tubes C and D.

In the arrangement shown, said A. C. signals are provided by connecting the control grid of the valve C through a resistance 5 to one terminal of the secondary winding 4 of a transformer F, and by connecting the control grid of the tube D through a resistance 6 to the second terminal of the winding 4. The primary winding of the transformer F is connected across alternating supply conductors L' and L² which may, and ordinarily will, form part of a distribution system supplying alternating current of conventional voltage and frequency, for example 115 volts and 60 cycles per second.

In Fig. 1 I have illustrated the use of the invention, by way of example, in a well known type of self balancing potentiometric measuring system E comprising a slide wire resistor E' and a cooperating slider contact E², and employed to measure the varying voltage of a thermocouple e. The measuring operation involves adjustments of the slider contact E² into new balancing positions on changes in the voltage of the thermocouple e. In the arrangement shown, the slider contact E² is in a balancing position when it results in a plate current flow in the control valve A, during the half cycles in which that valve is conductive, which is equal to the plate current flow in the valve B during the half cycles in which the last mentioned valve is conductive. When the contact is in its balancing position the measuring system E impresses a D. C.

voltage on the control grid 1 of the valve A through the conductor 7 which is equal to the regulable D. C. voltage impressed on the control grid 1 of the reference valve B by a voltage divider G. Such voltage equality requires that the algebraic sum of the potential difference between the point of the circuit E to which the conductor 7 is connected and the point engaged by the slider $E^2$, the voltage of the thermocouple e, and the voltage of a biasing battery ea in series with the thermocouple e must be equal to the voltage supplied to the grid 1 of the valve B by the voltage divider G. The latter comprises a potentiometer resistor G' having its ends connected to the terminals of a battery $G^2$, which also has its positive terminal connected to ground. The adjustments of the slider contact $E^2$ are effected by a reversible rebalancing motor H through a mechanical connection H'. The motor H is automatically actuated as hereinafter explained to rotate in the direction and to the extent required for such adjustment of the slider contact $E^2$ as is needed to rebalance the measuring apparatus following a change in the voltage of the thermocouple e.

The valves C and D are alternately driven beyond their current cut-off points by the secondary winding 4 of the transformer F which has its terminals connected to the control grids of the valves C and D through resistors 5 and 6, respectively, as previously stated. The cathode of the valve C is directly connected to the cathode of the valve A, and the cathode of the valve D is directly connected to the cathode of the reference valve B. The cathodes of the valves A and C are connected to ground through a common cathode resistor 8 and grounding conductor 10. The cathodes of the valves B and D are similarly connected to ground through a common cathode bias resistor 9 and grounding conductor 10.

The valves A, B, C and D are each provided with anode voltage from a source of unidirectional voltage shown as a voltage divider or potentiometer resistor I, having its opposite ends connected to positive and negative supply conductors 11 and 12, respectively. Ordinarily, the latter are connected to the output terminals of a rectifier supplying current of a suitable voltage, which may well be approximately 380 volts. For a biasing purpose hereinafter mentioned, the potentiometer resistor I is connected to a grounding conductor 10 at a point i adjacent but displaced somewhat from the negative supply conductor 12. The positive end of the voltage divider is connected through a conductor 13 and a resistor 14 of relatively high resistance to the anodes of the valves A and B. The plate circuit of the valve A which includes the conductor 13 and resistance 14 is completed by the cathode resistor 8 and the ground connection between the grounded end of that resistor and the grounded point i of the voltage dividing resistor I. The plate circuit of the valve B which also includes the conductor 13 and resistance 14, is similarly completed by the ground connection between the grounded lower end of a cathode resistor 9 and the grounded point i of the voltage dividing resistor I.

The plate circuit of the valve C comprises a conductor 15 which connects the anode of the valve C to the voltage dividing resistor I at an adjustable point i' intermediate its ends, and also comprises the cathode resistor 8 and the ground connection between the grounded end of the latter and the grounded point i of the resistor I. The anode of the valve D is also connected by the conductor 15 to the point i' of the voltage divider and the plate circuit of the valve D also includes the cathode resistor 9 and the ground connection between the grounded end of that resistor and the grounded point i of the resistor I.

The biasing voltage impressed on the control grid 1 of each of the valves C and D, is stabilized and made regulable by a conductor 16 which connects the midpoint of the secondary winding 4 of the transformer F to a potentiometer resistor IA at a point $i^2$ adjustable along the length of said resistor. The resistor IA has its lower end connected to the negative end of the voltage divider and has its upper end connected to the resistor I at a point $i^3$ at which the potential is somewhat more positive than at the point i.

The screen grid 2 of each of the valves C and D is connected directly to the anode of the valve. The screen grids 2 of the valves A and B are connected to the anodes of said valves through the previously mentioned resistor 14 and a dropping resistor 17 in series therewith. The end of the resistor 17 directly connected to the resistor 14 is directly connected to ground through a condenser 18, and each of the screen grids 2 of the valves A and B is connected to ground through a common condenser 19. A constant, though adjustable bias voltage, is impressed on the control grid of the reference valve B by the previously mentioned voltage divider G. As mentioned above, the latter comprises a potentiometer resistance G' connected at its ends to the terminals of a battery $G^2$, the positive terminal of the battery being connected to ground. A slider contact engaging and adjustable along the resistor G' is directly connected to the control grid of the valve B.

The alternating current signal produced by the conjoint action of the valves A and B is transmitted to the control grid 1 of a pentode valve J by means comprising a condenser 20 and a potentiometer resistor 21 connecting the anodes of the valves A and B to ground, and a conductor 22 directly connecting said grid to a slider contact engaging and adjustable along the resistor 21. The valve J may well be of the commercially available type 6J7. The anode of the valve J is connected to the positive end of the voltage divider I through a resistor 23, and the cathode of the valve J is connected to ground through a resistor 24 shunted by a by-pass condenser 25. The screen grid 2 of the valve J is connected through a resistor 26 to the positive end of the voltage divider I, and is connected to ground through a condenser 26A. The suppressor grid of the valve J is directly connected to the cathode of the valve.

The output circuit of the valve J is connected to the input circuit of electronic motor drive valves K and KA. Through the valves K and KA, the operation of the motor H is controlled by the signal transmitted from the valves A and B to the control grid of the valve J and amplified in the latter. As shown, a condenser 27 connects the anode of the valve J to the control grids of electronic valves K and KA.

The valves K and KA may well be the triodes of a commercially available 7N7 type twin triode valve. The anode of the valve K is connected to one end terminal, and the anode of the valve KA is connected to the other end terminal of the secondary winding 30 of a transformer M. The primary winding 31 of the transformer M is connected across branches of the previously mentioned supply conductor L' and L². The cathodes of the valves K and KA are connected through a common cathode resistor 32 to the grounding conductor 10. A center tap 33 from the transformer secondary winding 30 supplies current to the control winding 34 of the motor H. The latter is connected in parallel with a condenser 35 between the center tap 33 and a grounding conductor 10. The motor H has a power winding 36 connected in series with a condenser 37 across the supply conductors L' and L².

When an alternating current signal of the frequency of the voltage across the supply conductors L' and L² is impressed on the control grids of the valves K and KA, the motor H will be energized for rotation in one direction if the phase of the signal is substantially the same as the phase of the voltage across the supply conductors L' and L², and will be energized for operation in the reverse direction when the signal voltage phase is displaced 180° from the phase of the voltage across the supply conductors. The operation characteristics of the motor H and the system through which the motor is controlled by the valves K and KA are now well known to those skilled in the art, since a motor and motor drive system, including a motor and valves like the motor H and the valves K and K', and resistance-capacity coupled to an amplifier as shown in Fig. 1, are included in the widely used conversion type potentiometer which is disclosed and claimed in the application of Walter P. Wills, Serial No. 421,173, filed December 1, 1945, now Patent No. 2,423,540 of July 8, 1947, and is also disclosed in the Wills patent, No. 2,385,481 of September 25, 1945.

The motor H operates in one direction when the phase of the alternating current signal impressed on the control grids of the valves K and KA, is that of the voltage across the supply conductors L' and L², because the effective alternating current flow in the winding 34 then leads by approximately 90° the current flow in the power winding 36. The motor operates in the reverse direction when the phase of the signal impressed on the control grid of the valves is displaced 180° from the phase of the voltage across the supply conductors L' and L², since the effective alternating current flow in the winding 34 then lags the current flow in the winding 36 by approximately 90°.

The current flow through the control winding 34 of the motor H ordinarily comprises a direct current component, an alternating current fundamental component of the frequency of the voltage across the supply conductors L' and L², and components which are multiples or harmonics of said fundamental component. The number and character of the harmonic components and their relative magnitudes depend upon the operating conditions which determine the character of the control signal impressed on the control grid of the amplifier system including the valve J. The portion of the current flow in the winding 34 referred to above as the effective alternating current flow, is the resultant of the fundamental and odd harmonic components. Only the difference between the fundamental and odd harmonics appears in the output current flow in the winding 34 as a useful component. The even-harmonics oppose and neutralize one another insofar as concerns the driving torque on the motor H. The useless, even-harmonic output may be considerably greater that the useful component. This condition is undesirable since it causes the operating characteristic of the amplifier valve to be occupied by the useless component. Furthermore, distortion of the even-harmonic signal tends to production of a noise signal. In consequence, provision may advantageously be made in some cases to reduce or eliminate the even-harmonic components of the current flow. It is to be noted, however, that to permit amplification control, it is necessary to operate over a non-linear portion of the tube characteristic for the control valve A.

The signal impressed on the control grids of the valves K and KA by the amplifier J has no significant effect on the relative current flows through the valves K and KA when the control and reference valves A and B are connected as shown in Fig. 1, and the pulsating currents flowing in their plate circuits differ in phase only. When the amplitude of the unidirectional output current pulses in the valve A differs from the amplitude of the unidirectional current pulses of the valve B, the signal voltage impressed on the control grid 1 of the valve J includes an alternating component. That component will be in phase with, or 180° out of phase with the voltage across the supply conductors L' and L², depending on which of the valves A and B then has the larger anode current. An understanding of the operating characteristics first mentioned may be facilitated by a reference to the diagrams shown in Figs. 3 to 6.

Figure 3:
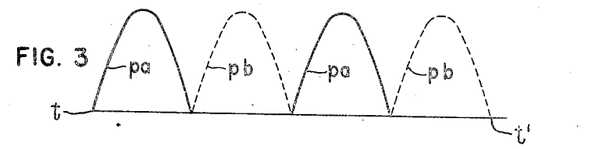
Figs. 3, 4, 5 and 6 are voltage curves illustrating the operation of the apparatus shown diagrammatically in Fig. 1.

In Fig. 3 the full line curve sections $pa$ represent the anode voltage of the valve K and the dotted line curve sections $pb$ represent the anode voltage of the valve KA during the alternating half cycles in the time interval $t$—$t'$ in which the valves K and KA are respectively conductive. In each of Figs. 4, 5 and 6 the curve sections $qa$ represent unidirectional output current pulses of the control valve A, and the curve sections $qb$ represent output current pulses of the valve B during the half cycles of the period $t$—$t'$.

Figure 4:
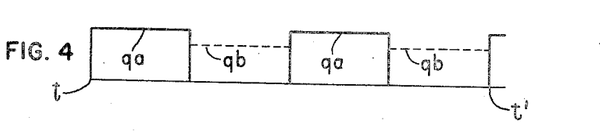
Figure 5:
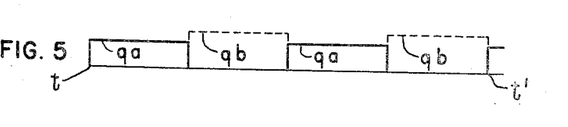
Figure 6:
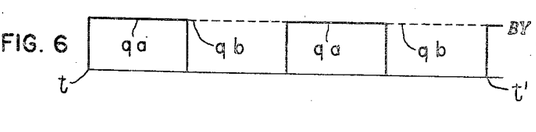

In Fig. 4 the amplitude of the current pulses $qa$ exceeds the amplitude of the pulses $qb$. In Fig. 5 the pulses $qa$ are smaller than the pulses $qb$. In Fig. 6 the pulses $qa$ and the pulses $qb$ are all of the same amplitude. As Fig. 6 plainly indicates, alternating pulses $qa$ and $qb$ of the same magnitude combine to form a continuous current. The pulsating current collectively formed by the current pulses $qa$ and $qb$ shown in Fig. 4, includes an alternating current component, as does the current formed by the unequal pulses $qa$ and $qb$ of Fig. 5. As will be apparent from inspection, however, the alternating current component of Fig. 4 is displaced 180° in phase from the alternating component of the current of Fig. 5. If it be assumed that the phase of the alternating component of the pulsating current of Fig. 4 is the same as the phase of the voltage across the supply conductors L' and L², as it may be, then the alternating current component of Fig. 5 is 180° out of phase with the voltage across the supply conductors L' and L².

The alternating current components of the currents shown diagrammatically in Figs. 4 and 5 and obtained in accordance with the present invention are of square wave form which is desirable because square waves include no even harmonics which as previously stated are objectionable. The direct connection of the cathodes of the exciter valves C and D to the cathodes of the valves A and B, respectively, minimizes tendency to distortion.

To enable the exciter unit comprising the valves

C and D of Fig. 1 to serve its intended purpose of alternately driving the control valve A and reference valve B beyond their current cut-off points during alternate half cycles of the voltage across the supply conductors L' and L², the transformer F is preferably adapted to step up the line voltage to a voltage of approximately 270 volts. One half of the output or secondary voltage of the transformer F is supplied to the control grid of the tube C, and the other half is supplied in opposite phase to the control grid of the valve D. Hence anode current flows through the valve C and associated cathode resistor 8 during half cycles in which the valve D is non-conductive, and those half cycles alternate with half cycles in which current flows through the valve D and associated cathode resistor 8 and in which the valve C is non-conductive. During each of the half cycles in which current thus flows through the valve C, the voltage drop in the associated cathode resistor 8 makes the cathode of the control valve A too positive to permit that valve to be conductive. Similarly, during the alternate half cycles in which the valve D is conductive, the voltage drop in the cathode resistor 9 prevents the reference tube B from being conductive.

During each half cycle in which the reference valve B and exciter valve C are non-conductive, the valve A is conductive, and when the control valve A and exciter valve D are non-conductive, current flows through the valve B. The current flowing in the valve B during alternate half cycles is of a constant value which is directly controlled by the device G and may be adjusted by adjusting the slider contact connected to the control grid of the valve B along the resistor G'. During the half cycles in which the valve A is conductive, the current flow through the valve will be equal in magnitude to the current flowing through the valve B during the other half cycles, provided the slider contact E² is in its balancing position, and the apparatus is properly calibrated and adjusted. If the slider contact E² is not in its balancing position, the current flow through the valve A will be increased or diminished depending upon the direction of unbalance.

While a converter system of the type disclosed herein does not necessarily require two tubes for producing the controlled and the reference signals, respectively, the arrangement of two tubes in twin tube circuits is advantageous and is desirably symmetrical. The problem of signal control in a converter of the type disclosed herein is to a large extent the usual problem of amplification control in accordance with small D. C. signals, namely the variation of the transconductance of the excitation electrode. The term "excitation electrode" as used herein means the electrode to which the excitation voltage is applied for amplification to produce the controlled signal which is to be compared to the reference signal, i. e., the excitation electrode in the Fig. 1 arrangement is the control grid of the valve A. In the preferred type of converter circuit shown in Fig. 1 in which the control and reference valves are connected to a common output impedance, and in the balanced condition, have similar signals applied out of phase to their excitation grids, any even harmonics produced by signal distortion in the two tubes add in the common output impedance, while the fundamentals and odd harmonics tend to cancel each other, as previously explained. While in the interest of a low residual or noise signal for balance it is desirable to prevent even-harmonic signal distortion, in order that amplification control be effected, it is necessary to operate over a non-linear portion of the tube characteristic. Since the D. C. signals available for control are very small, operation should take place in a highly curved portion of the tube characteristic in order to produce any substantial change in transconductance. In such case, the excitation should also be extremely small, otherwise the assumption that excitation takes place over a highly curved portion of the tube characteristic is no longer permissible. A very small excitation signal, however, is itself undesirable because stray pickup of 60 c. p. s. cannot be eliminated from the excitation circuit, which also carries the 60 c. p. s. fundamental of the excitation.

The various resistance and capacity values of the various resistors and condensers included in the circuit shown in Fig. 1 are not critical and may vary. However, by way of illustration and example, it is noted that good results were obtained in the operation of apparatus of the form shown in Fig. 1, including circuit elements having values as follows:

The resistance of resistor 5 is 200,000 ohms
The resistance of resistor 6 is 200,000 ohms
The resistance of resistor 8 is 200 ohms
The resistance of resistor 9 is 200 ohms
The resistance of resistor 14 is 250,000 ohms
The resistance of resistor 17 is 1,500,000 ohms
The resistance of resistor 21 is 1,000,000 ohms
The capacity of condenser 18 is 8 microfarads
The capacity of condenser 19 is 40 microfarads
The capacity of condenser 20 is .05 microfarads The unidirectional voltages across each of the biasing elements ea and G² may be 1.5 volts, the voltage across the voltage divider I may be 330 volts, and the A. C. voltage induced in the secondary winding 4 of the step-up transformer F may be 270 volts.

It will be noted that the output signal of the modulator unit of Fig. 1 is a square wave which is produced by alternately applying a positive pulse of 1/120 second duration to the cathodes of tubes A and B. The shape of these pulses beyond the value required to cut-off tubes A and B is immaterial. It is only necessary that the pulses have steep slopes in order to effect rapid transition from one tube to the other. For this reason, tubes of high mutual transconductance are desirable for the clipper tubes C and D. The direct coupling between the pairs of tubes A and B and C and D is of great importance in square wave operation. Both transformer couplings and resistance-capacity couplings have serious disadvantages at the low excitation frequency of 60 c. p. s. It is impossible to transmit perfect square waves with either coupling, due to the inherent frequency response characteristic of the couplings and the resultant distortion of the tops and bottoms of the square waves. While such distortion can be reduced, it is impossible to eliminate it. The tops of the square waves, when applied to the control grids of the tubes A and B, fall in a region of high transconductance, and therefore any distortion is greatly amplified. The bottoms fall in a region of very low transconductance or drive the tube to cut-off, so that any distortion is amplified very little or not at all, or is completely eliminated in the case of cut-off. The plate current waves then have different degrees of distortion at top and bottom. If two such waves with 180 degree phase difference are added, the resultant wave is a saw-tooth wave, even if the wave amplitudes are the same as for balance.

In Fig. 2 there is illustrated a modification of the arrangement of Fig. 1 wherein the connections to the control grids of the valves A and B are so arranged as to eliminate the need for the biasing battery ea of Fig. 1. Thus in the Fig. 2 arrangement, the conductor 7 from the potentiometric measuring system E is connected to the control grid of the valve A as before, but the conductor from the right-hand terminal of the thermocouple e is connected directly to the control grid of the valve B instead of being connected to ground through the biasing battery ea. Since the control grid of the valve B is connected to ground through the potentiometer resistor G', the voltage across the selected portion of the latter appears between the control grid and the cathode of the valve A, in series with the thermocouple e and the system E. Hence the need for the biasing battery ea of Fig. 1 is eliminated. The operation of the arrangement of Fig. 2 is identical to that just described in connection with the Fig. 1 arrangement, since the remainder of the Fig. 2 apparatus is identical to the corresponding apparatus of Fig. 1.

Figure 7:
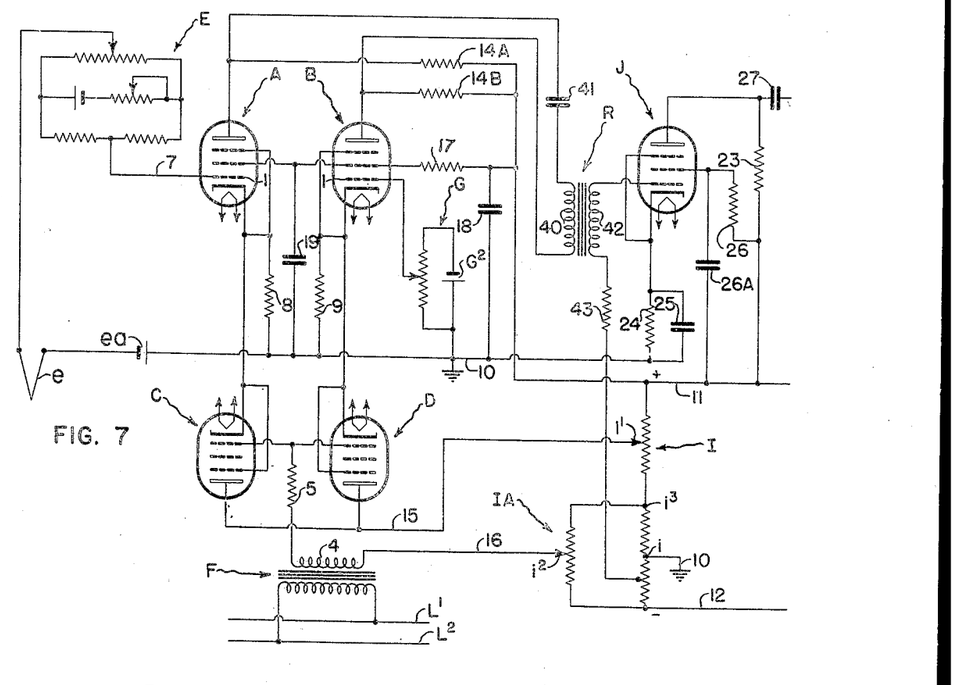
Fig. 7 is a diagram illustrating a modification of the arrangement shown in Fig. 1 in which the anode currents in the control and reference valves are in phase with one another.

In the practice of the present invention two signals having the same fundamental frequency and odd harmonics are compared. One of these signals remains constant and is used as a reference, while the amplitude of the other is controlled in accordance with variations in magnitude of a variable D. C. value. The reference signal and the control signal can be 180° out of phase and added as shown in Fig. 1, or they can be in phase and subtracted from each other as shown in Fig. 7. The arrangement shown in Fig. 7 differs from that shown in Fig. 1 in the following respects:

In Fig. 7 the control grids of both clipper valve C and D are connected through a common resistor 5 to one terminal of the secondary winding 3 of the transformer F, and the other terminal of said secondary winding is connected to one end of the conductor 16 which has its other end connected to the resistor 1A as in Fig. 1. In Fig. 7, the windings of the transformer F may be proportioned so that the voltage induced in the winding 4 is 135 volts, i. e., half of the voltage induced in the winding 4 of Fig. 1.

In Fig. 7 the anodes of the valves A and B are connected through separate resistors 14A and 14B, respectively, to the positive end of the voltage divider I. Each of the resistors 14A and 14B may have substantially the same resistance value, 250,000 ohms, as the resistor 14 of Fig. 1. In Fig. 7, the primary winding 40 of a coupling transformer R is connected in series with a condenser 41 between the anodes of the valves A and B, and the secondary winding 42 of the said transformer R has one terminal connected to the control grid of the valve J, and has its second terminal connected through a resistance 43 to the voltage divider I at a point adjacent its negative end.

Aside from the differences just noted, the circuit arrangement shown in Fig. 7 may be identical with that shown in Fig. 1, and corresponding parts are designated by the same reference symbols in Fig. 7 as in Fig. 1. In the normal operations of the apparatus shown in Fig. 7, the clipper valves C and D become conductive during the same half of each cycle of alternation of the voltage across the supply conductors L' and L², and both of said valves are non-conductive during the other half of each such cycle.. In consequence, the anode currents in the control and reference valves A and B, respectively, will be in phase with one another, instead of being 180° out of phase, as they are in the arrangement shown in Fig. 1. When the control signal impressed on the control grid of the valve A is equal to the signal impressed on the control grid of the valve B, the anode currents in the two valves will be equal and there will be no difference in potential between the anodes of the valves. When the signal impressed on the control grid of the valve A exceeds or is less than the signal impressed on the control grid of the valve B, the anode current flowing through valve A will be greater or less than the anode current of the valve B. In consequence, the anode of the valve A will then be respectively positive or negative relative to the anode of the valve B.

In the arrangement shown in Fig. 7, the difference in the potentials of the valves A and B, during the half cycles in which the valves are conductive, is utilized to impress a signal on the control grid of the valve J through the transformer R. That signal is proportional in magnitude to the potential difference between the anodes of the valves A and B, and is in phase with the voltage across the supply conductors L' and L², or is 180° out of phase with that voltage, depending on which of the two anodes is positive relative to the other. In the arrangement shown in Fig. 7, the clipping valves C and D operate as duplicates of one another and the general operation of the arrangement will not be changed if one of those valves is omitted and the cathode of the other is directly connected to the cathode of each of the valves A and B, provided the clipping valve retained is not overloaded.

In the contemplated operation of the apparatus shown in Fig. 7, the transformer R will have no effect on the potential difference between the control grid and cathode of the amplifier valve J during periods in which the signals impressed on the control grids of the valves A and B are the same. The control grid of the valve J may be so biased that during the last mentioned periods it maintains a small continuous current flow through the valve J. When the signals impressed on the control grids of the valves A and B become unequal and thus create a pulsating potential difference between the anodes of the valves A and B, the coupling transformer R applies a potential pulse to the control grid of the valve J during each half cycle in which the valves A and B are conductive. Each such pulse is dependent in magnitude on the magnitude of the potential difference between the anodes of the valves A and B, and its polarity is such as to increase or decrease the continuous bias signal on the control grid of the valve J depending on which of the anodes of the valves A and B is then positive relative to the other.

The effect of the potential pulses thus impressed on the control grid of the valve J is to include in the output current of the valve J an alternating current component of the same frequency as the voltage across the supply conductors L' and L². That component will be in phase, or 180° out of phase, with said voltage, depending on the relative polarities of the anodes of the valves A and B. Thus, if it be assumed that the continuous current flow through the valve J, during periods in which the potentials of the anodes of the valves A and B are equal, is equal to the continuous current represented by the alternating full line and dotted line sections of the upper horizontal line in Fig. 6, then the alternate full and dotted line sections of the upper line in Fig. 4 may represent the output current of the valve J during the periods in which the signal impressed on the control grid of the valve A is greater than the signal impressed on the control grid of the valve B, and the line formed by the horizontal full line and dotted line sections of Fig. 5 may represent the output current of the valve J during the period in which the signal impressed on the control grid of the valve A is smaller than the signal impressed on the control grid of the valve B.

In the arrangement shown in Fig. 7, as in that shown in Fig. 1, the modulator output signal for the condition of unbalance contains the fundamental frequency and odd harmonics which are either in phase or 180° out of phase with the reference signal, depending on whether the controlled signal is smaller or greater than the reference signal. The magnitude of the output signal depends on the magnitudes of the reference and controlled signals.

If either of the reference and controlled signals contains even harmonics, or if such harmonics are produced in the converter itself, they appear in the output signal in their full magnitude, for the balanced as well as the unbalanced conditions. Since only the difference of the fundamentals and odd harmonics appears in the output signal as a useful component, the useless even harmonic output may be considerably greater than the useful component, which is undesirable as has been explained.

It is necessary that the half waves of the excitation voltage be of equal duration within close limits. Any deviation from this ideal condition produces negative voltage peaks in the converter output signal when both tubes A and B conduct simultaneously and positive peaks when both tubes are cut off simultaneously. These peaks exceed the useful signal considerably. Negative peaks distort the useful output signal when passed through a resistance-capacity coupling, while positive peaks produce grid current flow in the subsequent amplifier tubes, thereby distorting the signal and making the arrangement unstable.

As shown, the grid bias for the tubes A and B is derived from batteries. Small bias cells can also be used. It is theoretically possible to derive the bias voltage from the power supply voltage divider I. It is to be noted, however, that although any ripple would be applied in phase to both grids, it would not cancel out in the common output resistor because only one of the parallel tubes A and B would be conductive at any time. For the same reason, ripple in other D. C. operating voltages does not cancel out. An increase in power supply voltage would eliminate the necessity of separate grid bias, since the biasing voltage developed across the cathode resistors would then be sufficient. Any fluctuations in D. C. supply voltage should cancel out under ideal conditions. However, the basic requirement for such cancellation is identical tubes, having identical plate and grid current characteristics, and requiring identical amounts of bias voltage, so that the same amount of ripple would be applied to each grid.

While in accordance with the provisions of the statutes, I have illustrated and described the best forms of embodiment of my invention now known to me, it will be apparent to those skilled in the art that changes may be made in the form of the apparatus disclosed without departing from the spirit of my invention, as set forth in the appended claims, and that in some cases certain features of my invention may be used to advantage without a corresponding use of other features.

Having now described my invention, what I claim as new and desire to secure by Letters Patent is:

1. Measuring apparatus including in combination a balanceable measuring circuit adapted to be unbalanced by changes in the value of a measurable quantity and operative when unbalanced to produce a unidirectional output voltage having a magnitude and a polarity respectively dependent on the extent and direction of unbalance of said measuring circuit, and operative when balanced to produce a unidirectional output voltage having a predetermined magnitude, two electronic control valves each having an anode, a cathode, and a control grid, each of said valves having an output circuit including impedance means and a source of unidirectional anode voltage connected in series with one another between the anode and cathode of said valve, cathode bias resistor means connected to the cathode of each of said valves, exciting means arranged for actuation by alternating current of predetermined frequency to increase the potential of the cathode of each valve thereby to make the latter non-conductive during periods recurring with said frequency and alternating with periods during which the potential of the cathode of said valve is reduced to make said valve conductive, means for impressing the output voltage of said measuring circuit between the control grid and the cathode of one of said valves, means for impressing a substantially constant unidirectional potential between the control grid and the cathode of the other of said valves, an electronic amplifier having an input circuit coupled to the output circuit of each of said valves and having an output circuit in which is produced an alternating current signal of said frequency having a magnitude and a phase respectively dependent on the extent and direction of unbalance of said measuring circuit, balancing means, a connection between said balancing means and said measuring circuit, and a connection between said balancing means and the output circuit of said amplifier, whereby said balancing means is operative under the control of said alternating current signal to rebalance said measuring circuit when the latter becomes unbalanced.

2. Apparatus as specified in claim 1 wherein said exciting means for making each of said control valves alternately non-conductive comprises an exciter electronic valve having an anode, a control grid, and a cathode, the latter being directly connected to the cathode of the associated one of said control valves, and means arranged for actuation by alternating current of said frequency for alternately raising and reducing the potential of the cathode of said exciter valve relative to the potential of the control grid of that valve thereby to make the latter alternately non-conductive and conductive.

3. Apparatus as specified in claim 2 wherein said cathode bias resistor means comprises a separate cathode bias resistor connected to the cathode of each of said control valves and wherein said exciting means includes a separate exciter valve associated with each of said control valves.

4. Apparatus as specified in claim 1 wherein said cathode bias resistor means comprises a separate cathode bias resistor connected to the cathode of each of said control valves.

5. Measuring apparatus including in combination a balanceable measuring circuit adapted to be unbalanced by changes in the value of a measurable quantity and operative when unbalanced to produce a unidirectional output voltage having a magnitude and a polarity respectively dependent on the extent and direction of unbalance of said measuring circuit, and operative when balanced to produce a unidirectional output voltage having a predetermined magnitude, two electronic control valves each having an anode, a cathode, and a control grid, each of said valves having an output circuit including impedance means and a source of unidirectional anode voltage connected in series with one another between the anode and cathode of said valve, a separate cathode bias resistor connected to the cathode of each of said valves, exciting means arranged for actuation by alternating current of predetermined frequency to increase the potential of the cathode of each valve thereby to make the latter non-conductive during periods recurring with said frequency and alternating with periods during which the potential of the cathode of the other of said valves is increased to make that valve non-conductive, means for impressing the output voltage of said measuring circuit between the control grid and the cathode of one of said valves, means for impressing a substantially constant unidirectional potential between the control grid and the cathode of the other of said valves, an electronic amplifier having an input circuit coupled to the output circuit of each of said valves and having an output circuit in which is produced an alternating current signal of said frequency having a magnitude and a phase respectively dependent on the extent and direction of unbalance of said measuring circuit, balancing means, a connection between said balancing means and said measuring circuit, and a connection between said balancing means and the output circuit of said amplifier, whereby said balancing means is operative under the control of said alternating current signal to rebalance said measuring circuit when the latter becomes unbalanced.

6. Apparatus as specified in claim 5 wherein said exciting means for making said control valves alternately non-conductive comprises two exciter electronic valves, each having an anode, a control grid, and a cathode, the cathode of one of said exciter valves being directly connected to the cathode of one of said control valves, and the cathode of the other of said exciter valves being directly connected to the cathode of the other of said control valves, circuit connections through which the source of anode voltage supplies anode voltage to said exciter valves, and means arranged for actuation by alternating current of said frequency for raising the potential of the cathode relative to that of the control grid of each of said exciter valves during periods alternating with periods in which the potential of the cathode relative to that of the control grid of the other of said exciter valves is raised.

7. Apparatus as specified in claim 5 wherein said exciting means for making said control valves alternately non-conductive comprises two exciter electronic valves, each having an anode, a control grid, and a cathode, the cathode of one of said exciter valves being directly connected to the cathode of one of said control valves, and the cathode of the other of said exciter valves being directly connected to the cathode of the other of said control valves, circuit connections through which the source of anode voltage supplies anode voltage to said exciter valves, an alternating current transformer having a primary winding adapted to be energized by alternating current of said frequency and having a secondary winding, a connection between one end terminal of said secondary winding and the control grid of one of said exciter valves, a connection between the other end terminal of said secondary winding and the control grid of the other of said exciter valves, a regulable source of unidirectional voltage, and means connecting said regulable voltage source between the midpoint of said secondary winding and the cathode of each of said control valves in series with the respective one of said cathode bias resistors.

8. Apparatus as specified in claim 5 wherein said output circuits of said control valves are connected to one terminal of said amplifier input circuit, and wherein the other terminal of said input circuit is connected to the cathodes of said control valves through said cathode bias resistors.

9. Measuring apparatus including in combination a balanceable measuring circuit adapted to be unbalanced by changes in the value of a measurable quantity and operative when unbalanced to produce a unidirectional output voltage having a magnitude and a polarity respectively dependent on the extent and direction of unbalance of said measuring circuit, and operative when balanced to produce a unidirectional output voltage having a predetermined magnitude, two electronic control valves each having an anode, a cathode, and a control grid, each of said valves having an output circuit including impedance means and a source of unidirectional anode voltage connected in series with one another between the anode and cathode of said valve, cathode bias resistor means connected to the cathode of each of said valves, exciting means arranged for actuation by alternating current of predetermined frequency to increase the potential of the cathode of each valve thereby to make the latter non-conductive during periods recurring with said frequency and alternating with periods during which the potential of the cathode of said valve is reduced to make said valve conductive, means for impressing the output voltage of said measuring circuit between the control grid and the cathode of one of said valves, means for impressing a substantially constant unidirectional potential between the control grid and the cathode of the other of said valves and also for impressing the last mentioned potential in series with said output voltage between the control grid and the cathode of said one of said valves, an electronic amplifier having an input circuit coupled to the output circuit of each of said valves and having an output circuit in which is produced an alternating current signal of said frequency having a magnitude and a phase respectively dependent on the extent and direction of unbalance of said measuring circuit, balancing means, a connection between said balancing means and said measuring circuit, and a connection between said balancing means and the output circuit of said amplifier, whereby said balancing means is operative under the control of said alternating current signal to rebalance said measuring circuit when the latter becomes unbalanced.

10. Measuring apparatus including in combination a balanceable measuring circuit adapted to be unbalanced by changes in the value of a measurable quantity and operative when unbalanced to produce a unidirectional output voltage having a magnitude and a polarity respectively dependent on the extent and direction of unbalance of said measuring circuit, and operative when balanced to produce a unidirectional output voltage having a predetermined magnitude, two electronic control valves each having an anode, a cathode, and a control grid, each of said valves having an output circuit including impedance means and a source of unidirectional anode voltage connected in series with one another between the anode and cathode of said valves, cathode bias resistor means connected to the cathode of each of said valves, exciting means arranged for actuation by alternating current of predetermined frequency to increase simultaneously the potential of the cathodes of both of said valves thereby to make said valves simultaneously non-conductive during periods recurring with said frequency and alternating with periods during which the potential of the cathodes of said valves is reduced to make said valves simultaneously conductive, means for impressing the output voltage of said measuring circuit between the control grid and the cathode of one of said valves, means for impressing a substantially constant unidirectional potential between the control grid and the cathode of the other of said valves, an electronic amplifier having an input circuit coupled to the output circuit of each of said valves and having an output circuit in which is produced an alternating current signal of said frequency having a magnitude and a phase respectively dependent on the extent and direction of unbalance of said measuring circuit, balancing means, a connection between said balancing means and said measuring circuit, and a connection between said balancing means and the output circuit of said amplifier, whereby said balancing means is operative under the control of said alternating current signal to rebalance said measuring circuit when the latter becomes unbalanced.

11. Apparatus as specified in claim 10 wherein said exciting means for making both of said control valves simultaneously non-conductive comprises an exciter electronic valve having an anode, a control grid, and a cathode, the latter being directly connected to the cathode of the associated one of said control valves, and means arranged for actuation by alternating current of said frequency for alternately raising and reducing the potential of the cathode of said exciter valve relative to the potential of the control grid of that valve thereby to make the latter alternately non-conductive and conductive.

12. Apparatus as specified in claim 10 wherein said cathode bias resistor means comprises a separate cathode bias resistor connected to the cathode of each of said control valves and wherein said exciting means for making both of said control valves simultaneously non-conductive comprises two exciter electronic valves, each having an anode, a control electrode, and a cathode, the cathode of one of said exciter valves being directly connected to the cathode of one of said control valves, and the cathode of the other of said exciter valves being directly connected to the cathode of the other of said control valves, circuit connections through which the source of anode voltage supplies anode voltage to said exciter valves, and means arranged for actuation by alternating current of said frequency for raising the potential of the cathodes relative to that of the control grids of both of said exciter valves simultaneously.

13. Apparatus as specified in claim 10 wherein said cathode bias resistor means comprises a separate cathode bias resistor connected to the cathode of each of said control valves and wherein said exciting means for making both of said control valves simultaneously non-conductive comprises two exciter electronic valves, each having an anode, a control electrode, and a cathode, the cathode of one of said exciter valves being directly connected to the cathode of one of said control valves, and the cathode of the other of said exciter valves being directly connected to the cathode of the other of said control valves, circuit connections through which the source of anode voltage supplies anode voltage to said exciter valves, an alternating current transformer having a primary winding adapted to be energized by alternating current of said frequency and having a second winding, connections between one end terminal of said secondary winding and the control grids of said exciter tubes, a regulable source of unidirectional voltage, and means connecting said regulable voltage source between the other end terminal of said secondary winding and the cathode of each of said control valves in series with the respective one of said cathode bias resistors.

14. Apparatus as specified in claim 10 including a coupling transformer having a primary winding and a secondary winding, wherein each of said output circuits of said control valves is connected to a respective end terminal of said primary winding, wherein one terminal of said amplifier input circuit is connected to one end terminal of said secondary winding, and wherein the other terminal of said input circuit is connected to the other end terminal of said secondary winding and to the cathodes of said control valves through said cathode bias resistor means.

15. Measuring apparatus including in combination a balanceable measuring circuit adapted to be unbalanced by changes in the value of a measurable quantity and operative when unbalanced to produce a unidirectional output voltage having a magnitude and a polarity respectively dependent on the extent and direction of unbalance of said measuring circuit, and operative when balanced to produce a unidirectional output voltage having a predetermined magnitude, two electronic control valves each having an anode, a cathode, and a control grid, each of said valves having an output circuit including impedance means and a source of unidirectional anode voltage connected in series with one another between the anode and cathode of said valve, a separate cathode bias resistor connected to the cathode of each of said valves, exciting means for passing current pulses through each of said cathode resistors to increase the potential of the cathode of each valve thereby to make the latter non-conductive during periods recurring with said frequency and alternating with periods during which the potential of the cathode of said valve is reduced to make said valve conductive, means for impressing the output voltage of said measuring circuit between the control grid and the cathode of one of said valves, means for impressing a substantially constant unidirectional potential between the control grid and the cathode of the other of said valves, an electronic amplifier having an output circuit coupled to the output circuit of each of said valves and having an output circuit in which is produced an alternating current signal of said frequency having a magnitude and a phase respectively dependent on the extent and direction of unbalance of said measuring circuit, balancing means, a connection between said balancing means and said measuring circuit, and a connection between said balancing means and the output circuit of said amplifier, whereby said balancing means is operative under the control of said alternating current signal to rebalance said measuring circuit when the latter becomes unbalanced.

16. Apparatus as specified in claim 15 wherein said exciting means for making each of said control valves alternately non-conductive comprises an exciter electronic valve having an anode, a control grid, and a cathode, the latter being directly connected to the cathode of the associated one of said control valves, and means arranged for actuation by alternating current of said frequency for alternately raising and reducing the potential of the cathode of said exciter valve relative to the control grid of that valve thereby to produce said current pulses to make said exciter valve alternately non-conductive and conductive.

17. Apparatus as specified in claim 15 wherein said exciting means for making said control valves alternately non-conductive comprises two exciter electronic valves, each having an anode and a cathode, the cathode of one of said exciter valves being directly connected to the cathode and to the cathode resistor of one of said control valves, and the cathode of the other of said exciter valves being directly connected to the cathode and to the cathode resistor of the other of said control valves, and means for passing unidirectional current pulses in series through the anode and cathode of each of said exciter valves and the cathode resistor to which the last mentioned cathode is connected during periods alternating with periods during which the unidirectional pulses are passed in series through the anode and cathode of the other of said exciter valves and the cathode resistor to which the last mentioned cathode is connected.

18. Apparatus as specified in claim 15 wherein said exciting means for making said control valves alternately non-conductive comprises two exciter electronic valves, each having an anode and a cathode, the cathode of one of said exciter valves being directly connected to the cathode and to the cathode resistor of one of said control valves, and the cathode of the other of said exciter valves being directly connected to the cathode and to the cathode resistor of the other of said control valves, and means for passing unidirectional current pulses in series through the anode and cathode of both of said exciter valves and both of said cathode resistors simultaneously during periods alternating with periods during which no unidirectional current pulses are passed through said exciter valves.

RUDOLF F. WILD.

REFERENCES CITED

The following references are of record in the file of this patent:

UNITED STATES PATENTS

| Number | Name | Date |
|---|---|---|
| 2,179,265 | Luck | Nov. 7, 1939 |
| 2,427,687 | Norgaard | Sept. 23, 1947 |
| 2,427,688 | Norgaard | Sept. 23, 1947 |
| 2,447,321 | Ertzman | Aug. 17, 1948 |

OTHER REFERENCES

Review of Scientific Instruments, Vol. 12, April 1941, "Combination Vacuum Tube Switch For, Double-Trace Cathode-Ray Oscillograph, Audio-Amplifier and Mixer," by Hughes et al., pages 183–187.

Du Mont Cathode Ray Tubes and Instruments, First edition, Spring 1943, type 185. An Electronic Switch and Square-Wave Generator, page 3 of latter specification.